(12) United States Patent
Zingaretti et al.

(10) Patent No.: US 8,194,947 B2
(45) Date of Patent: Jun. 5, 2012

(54) FACILITATING COMPARISON OF MEDICAL IMAGES

(75) Inventors: Gabriele Zingaretti, Santa Cruz, CA (US); Jimmy R. Roehrig, Aptos, CA (US); Julian Marshall, Los Altos, CA (US); Vincenzo Velocci, Scarborough (CA)

(73) Assignee: Hologic, Inc., Marlborough, MA (US)

( * ) Notice: Subject to any disclaimer, the term of this patent is extended or adjusted under 35 U.S.C. 154(b) by 1012 days.

(21) Appl. No.: 11/602,575

(22) Filed: Nov. 21, 2006

(65) Prior Publication Data

US 2008/0118138 A1    May 22, 2008

(51) Int. Cl.
*G06K 9/00* (2006.01)
*G06K 9/36* (2006.01)

(52) U.S. Cl. ........ 382/128; 382/131; 382/132; 382/286; 382/287; 382/289; 382/291; 382/294; 382/298

(58) Field of Classification Search .................. 382/128, 382/131–132, 286–289, 291, 293–298, 190, 382/195, 199, 201, 203, 216, 224, 225
See application file for complete search history.

(56) References Cited

U.S. PATENT DOCUMENTS

| | | | |
|---|---|---|---|
| 5,572,565 A * | 11/1996 | Abdel-Mottaleb | 378/37 |
| 5,579,360 A * | 11/1996 | Abdel-Mottaleb | 378/37 |
| 5,625,435 A * | 4/1997 | Lo et al. | 355/22 |
| 5,812,276 A * | 9/1998 | Jacobs | 358/302 |
| 5,825,910 A * | 10/1998 | Vafai | 382/132 |
| 5,828,774 A * | 10/1998 | Wang | 382/128 |
| 6,075,879 A * | 6/2000 | Roehrig et al. | 382/132 |
| 6,453,058 B1 * | 9/2002 | Murthy et al. | 382/128 |
| 6,542,771 B2 | 4/2003 | Saotome et al. | |
| 6,553,356 B1 * | 4/2003 | Good et al. | 706/15 |
| 6,630,937 B2 | 10/2003 | Kallergi et al. | |
| 6,873,717 B2 | 3/2005 | Lure et al. | |
| 7,333,645 B1 * | 2/2008 | Mitchell et al. | 382/128 |
| 7,386,155 B2 * | 6/2008 | Foos et al. | 382/128 |

(Continued)

OTHER PUBLICATIONS

Lubomir et al, "Automated registration of breast lesions in temporal pairs of mammograms for interval change analysis—local affine transformation for improved localization", Med. Phys. 28 (6) Jun. 2001 pp. 1070-1079.*

(Continued)

*Primary Examiner* — Chan S Park
*Assistant Examiner* — Avinash J Yentrapati
(74) *Attorney, Agent, or Firm* — Vista IP Law Group LLP

(57) ABSTRACT

Facilitating analysis of one or more mammography images on a review workstation is described. A point or region of interest is identified in a first mammography image of a human breast. The distance between the point or region of interest and a point of reference, preferably the breast nipple, on the first mammography image is determined. A locus of points in a second mammography image of the breast is calculated, the locus of points representing potential locations corresponding to the point or region of interest in the first mammography image, and the calculation being based at least in part on the distance between the point or region of interest and the point of reference. The locus of points is then highlighted a user so as to facilitate a determination by the user of one or more locations in the second mammography image corresponding to the point or region of interest in the first mammography image. The locus of points is preferably a circular section arc having a radius corresponding to the point or region of interest to nipple distance, and centered about the nipple in the second mammography image.

27 Claims, 4 Drawing Sheets

U.S. PATENT DOCUMENTS

| | | | |
|---|---|---|---|
| 7,556,602 B2 * | 7/2009 | Wang et al. | 600/437 |
| 2003/0007598 A1 * | 1/2003 | Wang et al. | 378/37 |
| 2003/0146938 A1 | 8/2003 | Geiger | |
| 2003/0216750 A1 | 11/2003 | Wong | |
| 2004/0068167 A1 | 4/2004 | Hsieh et al. | |
| 2004/0094167 A1 * | 5/2004 | Brady et al. | 128/916 |
| 2004/0100476 A1 | 5/2004 | Morita et al. | |
| 2004/0122704 A1 | 6/2004 | Sabol et al. | |
| 2004/0184644 A1 | 9/2004 | Leichter et al. | |
| 2005/0096530 A1 | 5/2005 | Daw et al. | |
| 2005/0105804 A1 * | 5/2005 | Francos et al. | 382/215 |
| 2005/0111716 A1 | 5/2005 | Collins et al. | |
| 2005/0123185 A1 | 6/2005 | Balasubramanian et al. | |
| 2005/0163360 A1 * | 7/2005 | Snoeren et al. | 382/132 |
| 2006/0025689 A1 * | 2/2006 | Chalana et al. | 600/456 |
| 2006/0251301 A1 * | 11/2006 | McNamara et al. | 382/128 |
| 2006/0274928 A1 * | 12/2006 | Collins et al. | 382/132 |
| 2007/0248210 A1 * | 10/2007 | Selse et al. | 378/37 |
| 2007/0274585 A1 * | 11/2007 | Zhang et al. | 382/132 |
| 2007/0280525 A1 * | 12/2007 | Basilico et al. | 382/132 |
| 2008/0044068 A1 * | 2/2008 | Evertsz et al. | 382/128 |

OTHER PUBLICATIONS

Hartswood, M., et. al., "'Repairing' the Machine: A Case Study of the Evaluation of Computer-Aided Detection Tools in Breast Screening," Proceedings of the Eighth European Conference on Computer-Supported Cooperative Work, Helsinki, Finland, pp. 375-394 (Sep. 2003).

* cited by examiner

US 8,194,947 B2

FACILITATING COMPARISON OF MEDICAL IMAGES

FIELD

This patent specification relates to medical imaging. Particularly, this patent specification relates to methods and apparatuses for facilitating analyses of mammography images.

BACKGROUND

Detection and analysis of target objects in medical images are useful and important tasks. For example, detection and diagnosis of abnormal anatomical regions in radiographs, such as masses and microcalcifications in women's breast radiographs (mammograms), are among the most important and difficult tasks performed by radiologists.

Breast cancer is a leading cause of premature death in women over forty years old. Evidence shows that early detection, diagnosis and treatment of breast cancer significantly improves the chances of survival, reducing breast cancer morbidity and mortality. Many methods for early detection of breast cancer have been studied and tested, among them mammography. To date, mammography has proven to be the most cost effective means of providing useful information to diagnosticians regarding abnormal features in the breast and potential risks of developing breast cancer in large populations. The American Cancer Society currently recommends the use of periodic mammography and screening of asymptomatic women over the age of forty with annual examinations after the age of fifty. Mammograms may eventually constitute one of the highest volume X-ray images routinely interpreted by radiologists.

An ongoing tension is found in today's radiology environment between providing high-quality image review and maintaining adequate patient throughput to keep costs under control. Despite ongoing advances in imaging technology and related data processing systems, it is the radiologist who continues to bear the burden of the cost-quality tradeoff. As used herein, radiologist generically refers to a medical professional that analyzes medical images and makes clinical determinations therefrom, it being understood that such person might be titled differently, or might have differing qualifications, depending on the country or locality of their particular medical environment.

Even subtle user interface issues associated with image presentation tools and/or decision support tools can have a significant impact on the radiologist review rate and/or the quality of detection/diagnosis. One issue relates to user analysis of a particular point or region of interest in a particular mammography view. Because of the nature of mammography being a projection of a partially compressed three-dimensional object, the human breast, into a two dimensional image plane, in some situations the radiologist may find it difficult to distinguish a mass or microcalcification from an overlap of tissues aligned along the axis of projection of the image. To make the distinction, the radiologist may examine a second view of the same breast, in an effort to determine the location in the second image that corresponds to the region of interest in the first image. The radiologist will make a visual comparison, sometimes aided by a separate ruler or simply using the radiologist's hand or fingers, of the radial distance of suspicious regions from the nipple. If these radii are roughly the same, it may lead to the conclusion that the region of interest is indeed a mass or microcalcification. If, on the other hand, there is no distinct mass or microcalcification in the second image at the appropriate location, it may lead to a conclusion that the region of interest in the first image is not a mass or microcalcification. In such cases it might be caused by, for example, an overlap in tissues along the axis of projection. In an example in the situation of screening mammography, a region of interest (ROI) may be identified in a craniocaudal ("CC") view, and radiologist would then like to view a corresponding region in a mediolateral oblique ("MLO") view.

Some techniques have been proposed and/or used that relate or attempt to relate ROI's between different views for other purposes. For example, U.S. Pat. No. 6,553,356 proposes detecting abnormal regions in living tissue by obtaining images from different views. In particular, the CAD system would make use of the distance from a ROI to the nipple as a basis for establishing identity of ROI's in another view of the same breast for the purpose of improving the CAD system's accuracy. U.S. Pat. No. 6,630,937 is an example of a known onscreen graphical annotation and measurement tool. In particular, tools such as an onscreen measurement ruler and a measuring square are proposed. U.S. 2005/0096530 A1 proposes an apparatus and method for customized report viewing of breast images such as MRI. The apparatus aims to alleviate problems associated with dealing with many hundreds of MRI images. The disclosure discusses one or more volumes of interest being displayed in multiple medical images and accompanied by measurements such as distance from the volume of interest to the nipple.

However, the above proposals do not appear to address solutions for shortcomings that are at least partially addressed by one or more of the preferred embodiments herein. For example, in the situation where a point or region of interest is already identified in first medical image and is not yet identified in second medical image, none of the above proposals appear to facilitate a user to determine the location or locations in the second image that correspond to the point or region of interest in the first medical image by highlighting potential locations in the second image.

SUMMARY

A method for facilitating analysis of one or more mammography images on a review workstation is provided. A point or region of interest is identified in a first mammography image of a human breast. The distance between the point or region of interest and a point of reference, preferably the breast nipple, on the first mammography image is determined. A locus of points in a second mammography image of the breast is calculated, the locus of points representing potential locations corresponding to the point or region of interest in the first mammography image, and the calculation being based at least in part on the distance between the point or region of interest and the point of reference. The locus of points is then highlighted so as to facilitate a determination by the user of one or more locations in the second mammography image corresponding to the point or region of interest in the first mammography image. The locus of points is preferably a circular section arc having a radius corresponding to the point or region of interest to nipple distance, and centered about the nipple in the second mammography image.

The point or region of interest is preferably selected by the user, or it can be selected automatically by a CAD processor system. The manner in which the locus of points is highlighted in the second mammography image is also preferably user selectable, and can include techniques such as: a line; a shaded region; a color contrasting with that of second mammography image; a blinking line; a dashed line, and an area outlined by a dashed line. The locus of points preferably lies substantially within the breast boundary of the second mammography image, with the boundary being preferably detected automatically by a CAD processing system. The two views may be CC and MLO views as is common in screening mammography in the United States, or they may be any other types of mammography views.

The present invention is also embodied in a softcopy review workstation and in a computer program.

DETAILED DESCRIPTION

Figure 1:
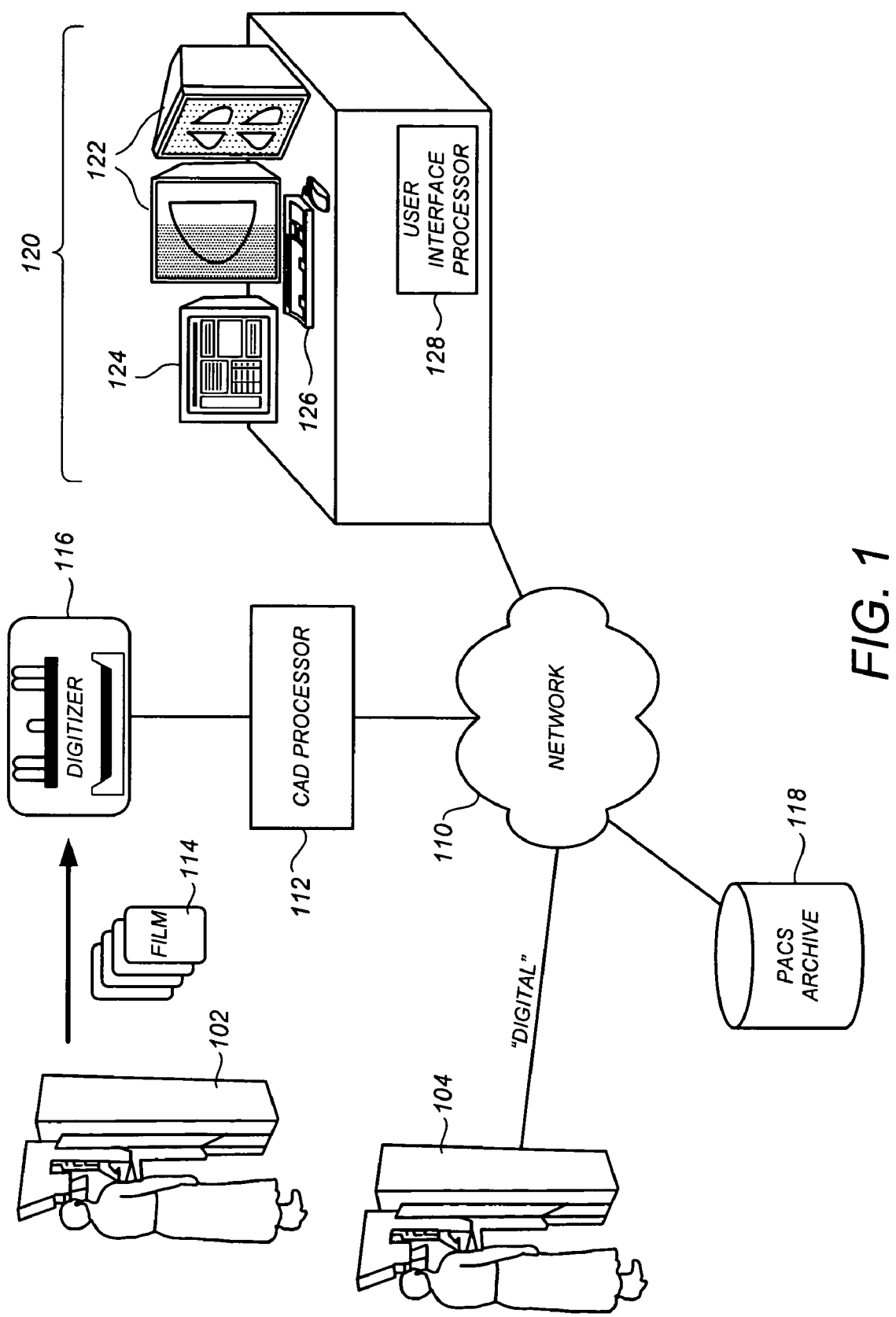
FIG. 1 illustrates a conceptual diagram of a medical imaging environment according to preferred embodiments disclosed herein.

FIG. 1 illustrates a conceptual diagram of a medical imaging environment according to preferred embodiments. Shown in FIG. 1 is a network 110, which may be a HIS/RIS (Hospital Information System/Radiology Information System) network, to which is coupled a film mammogram acquisition device 102, and a digital mammogram acquisition device 104. A computer-aided detection (CAD) processor 112 coupled to the network 110 receives digital medical images from device 104, and/or from a digitizer 116 that digitizes x-ray mammogram films 114 generated by the film mammogram acquisition device 102. The CAD processor 112 processes the medical images according to a CAD processing algorithm. It is to be appreciated, however, that the preferred embodiments can also be advantageously applied in medical imaging environments not having CAD capabilities, in which case the CAD processor 112 is not present. The medical images are then viewed (in conjunction with the associated CAD results, if present) at a softcopy review workstation 120.

Preferably, the various medical images and related information are communicated according to the DICOM (Digital Imaging and Communications in Medicine) standard and the network 110 supports the TCP/IP protocol, which is used as the transport protocol for the DICOM standard. Also coupled to the network 110 is a PACS (Picture Archiving and Communication System) archive 118, generally representing a repository for medical information associated with the medical imaging environment, including both current and archived images, current and archived CAD results (if present), radiology reports for completed cases, and so forth.

In one preferred embodiment, the softcopy review workstation 120 comprises a multi-modality workstation adapted and configured for a mammography environment. In one example, a Sectra IDS5/mx.net dedicated mammography workstation, commercially available from the assignee hereof, can be used that allows for third-party plug-ins. Softcopy review workstation 120 comprises a diagnostic/detection display 122, an administrative display 124, user input devices 126 (e.g., keyboard, mouse, trackball, pointers, etc), and a user interface processor 128. Administrative display 124 is used for input and output of a wide variety of information that may be associated with a particular set of medical images (e.g., listings, tables, plots, text descriptions, etc), as well as for system installation, maintenance, updating, and related tasks.

Notably, the medical imaging environment of FIG. 1 is presented by way of example only and is not intended to limit the scope of the preferred embodiments to this particular scenario. By way of example, different combinations of the devices of FIG. 1 can be placed adjacently to each other or integrated into the same hardware boxes without departing from the scope of the preferred embodiments. By way of still further example, the network 110 can be a wide-area network with the different nodes being distributed throughout a city, a country, or the world. Alternatively, and by way of still further example, some or all of the transfer of digital information can be achieved by physical transfer of disks, memory sticks, or other digital media devices without departing from the scope of the preferred embodiments. In view of the present disclosure, a person skilled in the art would be able to construct such plug-ins or other software packages capable of achieving the described user interfaces and processing functionalities without undue experimentation, using publicly available programming tools and software development platforms.

Figure 2:
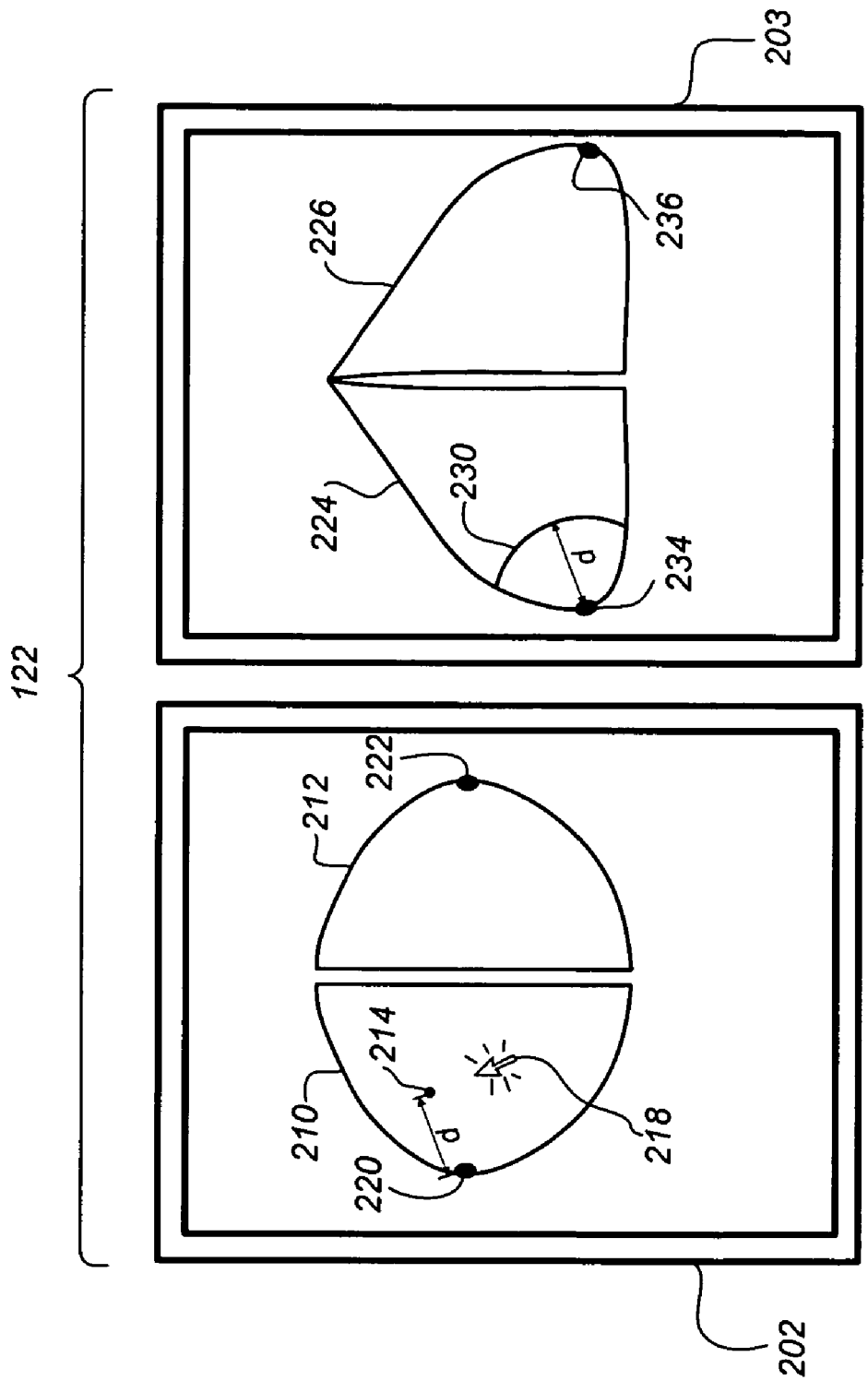
FIG. 2 illustrates a diagnostic/detection display and user interface according to preferred embodiments.

FIG. 2 illustrates a diagnostic display and user interface according to preferred embodiments. Shown is diagnostic display 122 which includes two high resolution flat panel displays 202 and 203 which display medical images and other information to the radiologist. Note that diagnostic display 122 is part of softcopy review station 120, shown in FIG. 1. On flat panel display 202, a pair of craniocaudal ("CC") view mammograms are shown. In particular, image 210 is a CC mammogram of a patient's right breast, referred to as "RCC", and image 212 is a CC mammogram of the patient's left breast, referred to a "LCC." Likewise, on display 203 is shown a pair of mediolateral oblique ("MLO") view mammograms. In particular, image 224 is a MLO mammogram of the patient's right breast, referred to as "RMLO", and image 226 is a MLO mammogram of the patient's left breast, referred to as "LMLO." Also shown on the mammograms 210, 212, 224 and 226 are nipples 220, 222, 234 and 236, respectively. The nipple location is preferably located using CAD processor 112 as is known in the art, although the nipple could be located manually by input from the radiologist. Also preferably located using CAD processor 112, shown in FIG. 1, are the boundaries of the breast tissue in each of the mammogram images 210, 212, 224 and 226.

According to preferred embodiments, an arrow cursor 218 is provided and positionable based on the radiologist's control via input devices 126, which are part of softcopy review workstation 120 both shown in FIG. 1. In the example of FIG. 2, the radiologist is interested in a point of interest 214 on RCC mammogram 210, and further the radiologist would like to find the location of the same point of interest on the corresponding mammogram of the same breast, namely on RMLO mammogram 224. According to one example, the radiologist selects the point of interest, such as by double clicking arrow cursor 218 on point of interest 214. The point of interest can correspond to a single pixel in the displayed image or a small group of pixels. In response to the radiologist's selection, user interface processor 128, shown in FIG. 1, then calculates the distance d from the point of interest 214 to the nipple 220. Then in real-time on the corresponding image of the same breast, RMLO mammogram 224 on display panel 203, user interface processor 128 displays an arc 230 superimposed on RMLO mammogram 224 having a radius equal to the distance d from the point of interest 214 to the nipple 220. Note that the arc 230 is preferably centered about nipple 234. As shown in FIG. 2, arc 230 is preferably drawn such that it does not pass thought the known breast boundaries of RMLO mammogram 224.

Alternatively, according to another example, instead of a single point of interest, a locus of points, or a region on interest can be selected in the first image. In FIG. 2, according to this example, reference number 214 represent a locus or a region of interest. The region of interest is selected by the radiologist, for example, by click-and-drag or other known methods. The region of interest could also be a region of interest already identified to the radiologist by CAD processor 112. Depending on the size of the region of interest, arc 230 could be drawn as a wider line, semi-transparent or shaded region, or dotted line enclosed arc-shaped region so as to aid the radiologist in locating the corresponding position or positions in RMLO mammogram 224. It will be understood by those of skill in the art that other methods of visually highlighting the line or area corresponding the point or region of interest can be used, including the use of colors different from those used in the background mammography image, blinking, dashed lines, different weights of lines and different shadings of lines. Additionally, according to an alternative embodiment, the radiologist is able turn on and off the highlighted line or area and to select the type of highlighting, depending upon the radiologist's preferences. As another example, the highlighting can be offset radially from the locus of interest so it would not obscure the region of interest and the radiologist can examine the pertinent part of the image without switching off the highlighting.

According to another alternate preferred embodiment, the point of region of interest is selected automatically by CAD processor 112 and user interface processor 128, without active input from the radiologist. According to this embodiment, the arc 230 is automatically drawn which corresponds to the point or region of interest 214. This type of automatic selection in one image and corresponding arc display in a second image could be activated optionally according to the radiologist's preferences.

Thus, according to the disclosed embodiments a system and method is provided which aids the radiologist in analyzing mammogram images. For example, if the radiologist notices a suspicious artifact in one view, the radiologist may look for the presence of absence of a corresponding artifact in different views. If the radiologist sees a corresponding artifact in the second view, it may lead to the determination that the artifacts represent an actual mass or microcalcification, whereas if there is no corresponding artifact in the second view, it may lead to the determination the artifact in the first image is not a mass or microcalcification at all, and rather caused by, for example, overlapping tissues. This can provide a useful aid for the radiologist in making this correlation, thereby leading to more accurate analysis of mammograms.

Figure 3:
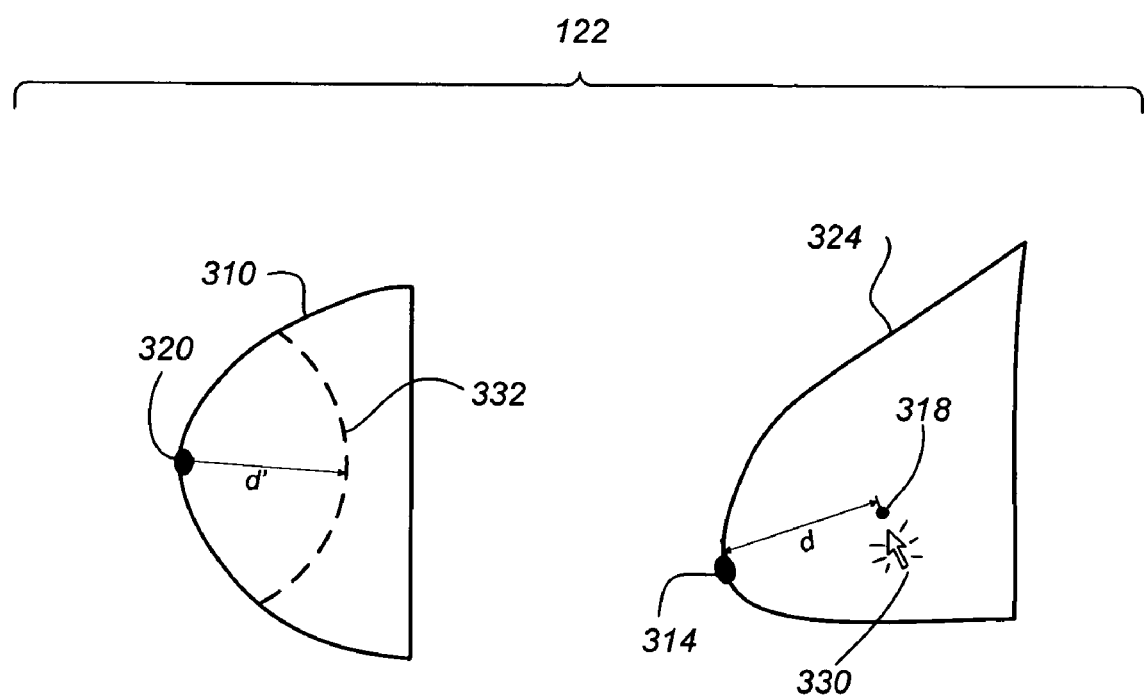
FIG. 3 illustrates a diagnostic/detection display and user interface according to alternate preferred embodiments.

FIG. 3 illustrates a diagnostic display and user interface according to alternate preferred embodiments. In some situations, improvements in accuracy of implementation can be achieved using information such as the relative breast compression of the mammograms. Diagnostic display 122 includes two high resolution flat panels displaying medical images RCC mammogram 310, and RMLO mammogram 324. Also shown in FIG. 3 are nipples 320 and 314 on mammograms 310 and 324 respectively. The nipple location and breast boundaries are preferably located using CAD processor 112, shown in FIG. 1, but may alternatively be identified manually. The radiologist selects a point or region of interest 318 using arrow cursor 330 or other suitable means via input devices 126, also shown in FIG. 1.

In this example, the distance between the nipple and point or region of interest 318 is denoted as d. As previously described with respect to FIG. 2 above, in real-time the user interface processor calculates the distance d and displays an arc 332 superimposed on RCC mammogram 310. However, according to this embodiment, compression information is used to modify the distance of the arc 332 from nipple 320 to d'. The compression information is commonly available, for example from the standard DICOM header of the digital images. In the example of FIG. 2, if RCC mammogram 310 has a compression of D1, and RMLO mammogram 324 has a compression of D2, then the modified arc distance can be calculated as: $d'=d(D1/D2)*f(D1/D2)$, where $f(x)$ is a function of the compression characteristics of the tissue. The function $f(x)$ can be developed experimentally depending on the anticipated application of the method and apparatus described in this patent specification, but a unit factor has been found useful in some situations.

Figure 4:
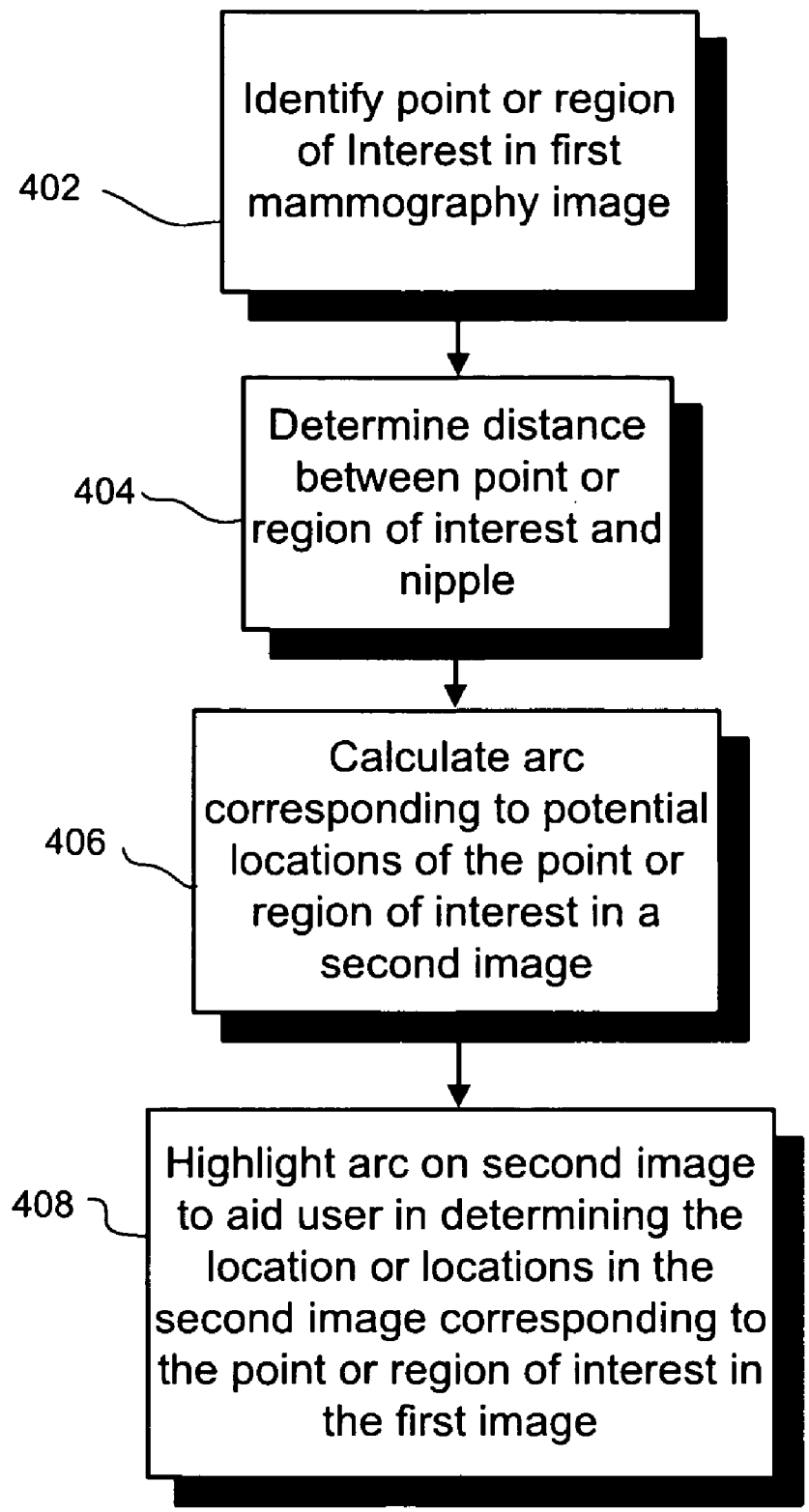
FIG. 4 is a flow chart showing steps of facilitating analysis of mammography images according to certain preferred embodiments.

FIG. 4 is a flow chart showing steps of facilitating analysis of mammography images according to certain preferred embodiments. In step 402, the point or region of interest in the first mammography image is identified. According to some embodiments as described above, this identification comes from the radiologist using a mouse or other user interface device. In other embodiments, the regions or points can be automatically selected by the CAD processor.

In step 404 the distance is measured between the point or region on interest and the nipple. For larger regions of interest, the center of the region can be used to measure the distance to the nipple. The nipple is preferably automatically segmented by the CAD processor, or it can be identified by the user. In step 406 a locus of points, preferably an arc, is calculated such that it corresponds to potential locations of the point or region of interest in the second mammography image. As described above, the arc is preferably a circular section having a radius either equal to the distance determined in step 404, or compensated as a function of relative compressions of the breast in taking the first and second mammography images, or selectively offset radially.

In step 408, the locus or arc is highlighted on the second image to the user so as to aid the user in determining the location or locations in the second image that correspond to the point or region of interest in the first image. Preferably, the user is able to select the manner in which the arc is highlighted so that the aiding in analysis of the mammography images is both maximized while not being too distracting. Options for highlighting include a simple line, shaded lines, colored lines, blinking or dashed or dotted lines, shaded regions, outlined regions or combinations of the above.

Although the examples shown herein have been primarily in the context of CC and MLO views, since that is very common in screening mammography applications, the present invention is applicable to other applications as well including LAT (ML and LM) view, exaggerated views, etc. Also, while many of the examples describe above used the example of a radiologist as the user, the invention is also applicable to other users. For example, physicians or other users may use the invention in analyzing mammography images in planning for a biopsy, surgery, or as part of other cancer treatment.

While the invention has been described in conjunction with the exemplary embodiments described above, many equivalent modifications and variations will be apparent to those skilled in the art when given this disclosure. Accordingly, the exemplary embodiments set forth above are considered to be illustrative and not limiting. Various changes to the described embodiments may be made without departing from the spirit and scope of the invention. Reference to the details of the embodiments described are not intended to limit the scope of the invention, which is limited only by the scope of the claims set forth below.

What is claimed is:

1. A method for facilitating analysis of one or more mammography images on a review workstation, the review workstation including at least one processor, a user input device, and a display device, the method being implemented by the review workstation, the method comprising the steps of:
displaying on the display device a first mammography image and a second mammography image of a human breast for viewing by a user of the review workstation, the second mammography image being a different mammographic view of the breast than the first mammography image;
receiving from the user, by the user input device, an input that identifies at least one point of interest in the first mammography image;
determining a distance between the at least one point of interest and a location of a nipple of the breast in the first mammography image;
calculating a locus of points in the second mammography image of the breast, the locus of points representing potential locations in the second mammography image that correspond to the at least one point of interest in the first mammography image, the calculation being based at least in part on the distance between the at least one point of interest and the nipple location in the first mammography image;
highlighting the locus of points on the display of the second mammography image so as to facilitate a determination by the user of one or more locations in the second mammography image corresponding to the at least one point of interest in the first mammography image, wherein the locus of points on the display of the second mammography image is in a shape of an arc having a center at a location of the nipple of the breast in the second mammography image; and
determining, in the second mammography image, a modified distance between the nipple and the locus of points highlighted on the display of the second mammography image, the modified distance being determined based at least in part on respective compressions associated with respective first and second mammography images.

2. A method according to claim 1 wherein the arc is a segment of a circle having a radius corresponding to the distance between the at least one point of interest and the nipple location in the first mammography image.

3. A method according to claim 1 wherein the arc is a segment of a circle having a radius corresponding to the distance between the at least one point of interest and the nipple location in the first mammography image multiplied by a compensation factor based at least in part on relative compression of the breast during an acquisition of the first and second mammography images.

4. A method according to claim 1 wherein the at least one point of interest is a region comprising a plurality of points.

5. A method according to claim 1 wherein the step of highlighting is selectable according to a preference of the user.

6. A method according to claim 1 wherein the step of highlighting comprises displaying one or more of the following which represents the locus of points: a line, a shaded region, a color contrasting with that of the second mammography image; a blinking line; a dashed line, and an area outlined by a dashed line.

7. A method according to claim 1 wherein the locus of points lies within the breast boundary of the second mammography image.

8. A method according to claim 1 wherein the nipple location is determined automatically.

9. A method according to claim 1 wherein one of the first and second mammography images is a CC view and the other is an MLO view of the breast.

10. A softcopy review workstation comprising:
a display device comprising one or more displays and arranged to display medical images to a user including a first mammography image and a second mammography image of a human breast, the second mammography image being a different mammographic view of the breast than the first mammography image;
a user input device; and
a processing system in communication with the display device and the user input device, the processing system being configured to receive from the user, by the user input device, an input that identifies at least one point of interest in the first mammography image, calculate a locus of points in the second mammography image based at least in part on a distance between the at least one point of interest and a location of a nipple of the breast in the first mammography image, the locus of points being representative of potential locations in the second mammography image that correspond to the at least one point of interest in the first mammography image, highlight the locus of points on the display of the second mammography image to the user so as to facilitate a determination by the user of one or more locations in the second mammography image corresponding to the at least one point of interest in the first mammography image, wherein the locus of points on the display of the second mammography image is in a shape of an arc having a center at a location of the nipple of the breast in the second mammography image, and determine, in the second mammography image, a modified distance between the nipple and the locus of points highlighted on the display of the second mammography image, the modified distance being determined based at least in part on respective compressions associated with respective first and second mammography images.

11. A softcopy review workstation according to claim 10 wherein the arc is a segment of a circle having a radius corresponding to the distance between the at least one point of interest and the nipple location in the first mammography image.

12. A softcopy review workstation according to claim 10 wherein the arc is a segment of a circle having a radius corresponding to the distance between the at least one point of interest and the nipple location in the first mammography image multiplied by a compensation factor based at least in part on relative compression of the breast during an acquisition of the first and second mammography images.

13. A softcopy review workstation according to claim 10 wherein the at least one point of interest is a region comprising a plurality of points.

14. A softcopy review workstation according to claim 10 wherein the processing system is configured to highlight highlights the locus of points by displaying one or more of the following on the display device: a line, a shaded region, a color contrasting with that of the second mammography image; a blinking line; a dashed line, and an area outlined by a dashed line.

15. A softcopy review workstation according to claim 10 wherein the locus of points lies within the breast boundary of the second mammography image, and the nipple location is determined automatically.

16. A computer readable medium tangibly embodying one or more sequences of instructions wherein execution of the one or more sequences of instructions by one or more processors causes the one or more processors to execute a process to facilitate viewer comparison of medical images, the process comprising:
    causing to be displayed on a display device a first mammography image and a second mammography image of a breast for viewing by a user, the second mammography image being a different mammographic view of the breast than the first mammography image;
    receiving, by an input from the user at a user input device, an identity of at least one point of interest in the first mammography image;
    calculating a locus of points in the second mammography image, the locus of points representing potential locations in the second mammography image corresponding to the at least one point of interest in the first mammography image, the calculation being based at least in part on a distance between the at least one point of interest and a location of a nipple of the breast in the first mammography image;
    causing the locus of points on the display of the second mammography image to be highlighted so as to facilitate a determination by the user of one or more locations in the second mammography image corresponding to the at least one point of interest in the first mammography image, wherein the locus of points on the display of the second mammography image is in a shape of an arc having a center at a location of the nipple of the breast in the second mammography image; and
    determine, in the second mammography image, a modified distance between the nipple and the locus of points highlighted on the display of the second mammography image, the modified distance being determined based at least in part on the respective compressions associated with respective first and second mammography images.

17. A computer readable medium according to claim 16 wherein the locus of points is in the shape of an arc has having a radius corresponding to the distance between the at least one point of interest and the nipple in the first mammography image.

18. A computer readable medium according to claim 16 wherein the locus of points is in the shape of arc is a segment of a circle having a radius corresponding to the distance between the at least one point of interest and the nipple in the first mammography image multiplied by a compensation factor based at least in part on relative compression of the breast during an acquisition of the first and second mammography images.

19. A computer readable medium according to claim 16 wherein the at least one point of interest is a region comprising a plurality of points.

20. A computer readable medium according to claim 16 wherein the locus of points is highlighted by displaying one or more of the following on the display device: a line, a shaded region, a color contrasting with that of the second mammography image; a blinking line; a dashed line, and an area outlined by a dashed line.

21. A computer readable medium according to claim 16 wherein the locus of points lies within the breast boundary of the second mammography image, and wherein the nipple location is determined automatically.

22. A system comprising:
    an x-ray image acquisition device operable to provide a first mammogram and a second mammogram of a patient's breast, the second mammogram being a different mammographic view of the breast than the first mammogram;
    an image processing and display station coupled with the image acquisition device and operable to receive the first and second mammograms therefrom, the station comprising:
        a display operable to concurrently display for viewing by a user a first image and a second image representative of the first and second mammograms, respectively;
        a user input device operable to receive from the user an identification of a region of interest in the first image; and
        a station processor operable to respond to the identification of the region of interest in the first image by calculating a distance between the region of interest and a location of a nipple of a point of reference of the breast in the first image and causing the display to highlight a locus of points on the second image indicative of likely locations in the second image related to the region of interest in the first image, wherein the locus of points on the display of the second image is in a shape of an arc having a center at a location of the nipple of the breast in the second mammography image;
        wherein the station processor is operable to determine the location of the highlighting on the second image based at least in part on the distance between the region of interest and the point of reference in the first image,
    the highlighting facilitating a determination by the user of whether both the region of interest in the first image and the locus of points in the second image show indications of a suspected lesion, and thus facilitating a determination of whether a suspected lesion is present in the patient's breast, and
    the station processor being further operable to respond to the identification of the region of interest in the first image by calculating, in the second mammography image, a modified distance between the nipple and the locus of points on the display in the second image, the modified distance being determined based at least in part on respective compressions associated with respective first and second images.

23. A system as in claim 22 in which one of the first and second mammograms is a CC view of the patient's breast and the other one is an MLO view of the same breast.

24. A method according to claim 1, the modified distance being determined based at least in part upon:
    $d' = d(D1/D2) * f(D1/D2)$, wherein
    d' is the modified distance within the second mammography image;
    d is the distance between the at least one point of interest and the location of the nipple within the first mammography image;
    D1 is a first compression characteristic of the breast,
    D2 is a second compression characteristic of the breast, and
    $f(D1/D2)$ is a function of first and second compression characteristics.

25. A softcopy review workstation according to claim 10, the processor being configured to determine the modified distance based at least in part upon:
    $d' = d(D1/D2) * f(D1/D2)$, wherein d' is the modified distance within the second mammography image;

d is the distance between the at least one point of interest and the location of the nipple within the first mammography image;

D1 is a first compression characteristic of the breast,

D2 is a second compression characteristic of the breast, and f(D1/D2) is a function of first and second compression characteristics.

26. A computer readable medium according to claim 16, the modified distance being determined based at least in part on:

d'=d(D1/D2)*f(D1/D2), wherein d' is the modified distance within the first mammography image;

d is the distance between the at least one point of interest and the location of the nipple within the second mammography image;

D1 is a first compression characteristic of the breast,

D2 is a second compression characteristic of the breast, and f(D1/D2) is a function of first and second compression characteristics.

27. A system according to claim 22, the modified distance being determined based at least in part upon:

d'=d(D1/D2)*f(D1/D2), wherein d' is the modified distance within the second mammography image;

d is the distance between the region of interest and the location of the nipple within the first mammography image;

D1 is a first compression characteristic of the patient's breast,

D2 is a second compression characteristic of the patient's breast, and f(D1/D2) is a function of first and second compression characteristics.

* * * * *